United States Patent
Daniel et al.

(10) Patent No.: US 6,747,840 B2
(45) Date of Patent: Jun. 8, 2004

(54) METHOD AND APPARATUS FOR FINE TUNING DISC DRIVE COVER TO IMPROVE ACOUSTICAL PERFORMANCE

(75) Inventors: Matthew Daniel, Oklahoma City, OK (US); Svetlana I. Kovinskaya, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 197 days.

(21) Appl. No.: 09/902,926

(22) Filed: Jul. 11, 2001

(65) Prior Publication Data

US 2002/0109938 A1 Aug. 15, 2002

Related U.S. Application Data

(60) Provisional application No. 60/267,802, filed on Feb. 9, 2001.

(51) Int. Cl.[7] .................... G11B 33/08; G11B 33/14
(52) U.S. Cl. .................................................. 360/97.01
(58) Field of Search ...................... 360/97.01, 97.02, 360/97.03

(56) References Cited

U.S. PATENT DOCUMENTS

| | | | |
|---|---|---|---|
| 5,214,549 A | 5/1993 | Baker et al. | 360/97.02 |
| 5,235,482 A | 8/1993 | Schmitz | 360/97.02 |
| 5,282,100 A | 1/1994 | Tacklind et al. | 360/97.02 |
| 5,598,306 A | 1/1997 | Frees et al. | 360/97.02 |
| 5,757,580 A | 5/1998 | Andress et al. | 360/97.02 |
| 5,781,373 A | 7/1998 | Larson et al. | 360/97.02 |
| 5,877,915 A * | 3/1999 | Ishida | 360/97.03 |
| 5,886,489 A | 3/1999 | Rowan et al. | 318/439 |
| 5,898,572 A | 4/1999 | Shennib et al. | 361/713 |
| 6,075,672 A | 6/2000 | Morris et al. | 360/97.01 |
| 6,081,406 A | 6/2000 | Morris et al. | 360/97.01 |
| 6,157,116 A | 12/2000 | Sampietro et al. | 310/334 |
| 6,178,060 B1 | 1/2001 | Liu | 360/78.07 |
| 6,204,621 B1 | 3/2001 | Gotou | 318/599 |
| 6,229,668 B1 | 5/2001 | Huynh et al. | 360/97.01 |
| 6,288,866 B1 * | 9/2001 | Butler et al. | 360/97.01 |
| 6,411,463 B1 * | 6/2002 | Janik et al. | 360/97.01 |
| 6,445,534 B1 * | 9/2002 | Tsuda et al. | 360/97.01 |
| 6,529,345 B1 * | 3/2003 | Butler et al. | 360/97.01 |
| 6,536,555 B1 * | 3/2003 | Kelsic et al. | 369/263 |

* cited by examiner

*Primary Examiner*—David L. Ometz
*Assistant Examiner*—C R Beacham
(74) *Attorney, Agent, or Firm*—Jennifer M. Buenzow

(57) ABSTRACT

A disc drive system includes a base with sidewalls, a spindle attached to the base, and at least one disc attached to the spindle. A cover is also included for attaching to the base. The cover and the base form a disc enclosure which encloses the at least one disc, a portion of the spindle, and the actuator assembly. The disc drive system also includes a cover that is the prime acoustical radiator from the disc drive. The cover includes at least one dampening member attached by the adhesive. The dampening member is provided with a cut or slit therein to shift the resonant frequency of the cover. The cut increases area with high value of shear deformation in the adhesive and increases the loss factor.

25 Claims, 12 Drawing Sheets

METHOD AND APPARATUS FOR FINE TUNING DISC DRIVE COVER TO IMPROVE ACOUSTICAL PERFORMANCE

RELATED APPLICATIONS

This application claims the benefit under 35 U.S.C. 119(e) of U.S. Provisional Application Serial No. 60/267,802 filed Feb. 9, 2001.

FIELD OF THE INVENTION

The present invention relates to the field of data-storage devices. More particularly, this invention relates to a method and apparatus for reducing acoustic noise radiated by a disc drive.

BACKGROUND OF THE INVENTION

Devices that store data are key components of any computer system. Computer systems have many different devices where data can be stored. One common device for storing massive amounts of computer data is a disc drive. The basic parts of a disc drive are a disc assembly having at least one disc that is rotated, an actuator that moves a transducer to various locations over the rotating disc, and circuitry that is used to write and/or read data to and from the disc via the transducer. The disc drive also includes circuitry for encoding data so that it can be successfully retrieved from and written to the disc surface. A microprocessor controls most of the operations of the disc drive, in addition to passing the data back to the requesting computer and taking data from a requesting computer for storing to the disc.

The disc drive includes a transducer head for writing data onto circular or spiral tracks in a magnetic layer the disc surfaces and for reading the data from the magnetic layer. In some drives, the transducer includes an electrically driven coil (or "write head") that provides a magnetic field for writing data, and a magneto-resistive (MR) element (or "read head") that detects changes in the magnetic field along the tracks for reading data.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc-drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc. Servo feedback information is used to accurately locate the transducer. The actuator assembly is moved to the required position and held very accurately during a read or write operation using the servo information.

An operating disc drive can emit relatively large amounts of acoustic noise generated by vibrations of the disc drive enclosure caused by the pressure from inside air, disturbed by the rotating discs. The spindle and actuator movements create forces that act on the structure of the disc drive. When the forces are applied to the device enclosure, the forces are converted into displacements which in turn create pressure waves in the surrounding air which are perceived as acoustic noise to the human ear.

The actuator assembly moves in response to energizing a voice coil motor to move the actuator assembly around a pivot axis, thereby swinging each of the arms associated with the actuator assembly, the load springs, and associated read/write head over the associated disc surface. When moved in this manner during normal operation, the assembled load springs and associated read/write head tend to vibrate at some frequencies. The spindle motor rapidly spinning the discs contributes additional vibration. Vibration from the spindle motor and movement of the actuator assembly may be transmitted to the disc drive housing through the pivot and spindle journals. The resulting vibration in the housing causes radiation of acoustic noise, especially from the cover. Such acoustic noise may be annoying and may suggest poor quality to the user. There are also standards for acoustic noise that are required by many manufacturers.

The device enclosure actually acts like a radiating surface for the internal forces created by the spindle and actuator movement. The dynamics of the device enclosure, such as the natural modes of vibration, can amplify for the forces generated inside the drive. A frequency chart of disc drive sound power indicates that the highest level of drive noise emission is in the frequency band resulting from the first cover resonance. In this frequency band, the cover loses its efficiency to provide transmission losses to counter act the noise produced by the rotating discs. Moreover, the cover response to forces produced by the voice coil motor (VCM), the actuators, and the spindle motor at the first cover resonance is maximal which results in additional increase in the cover vibration and sound radiation in the above referenced frequency band.

In practice, the first cover resonance takes place in the frequency range of 1000–1500 Hz and its width is about 50–100 Hz depending on the specific design of a particular disc drive. The existing VCM actuators have the first acoustically significant resonance (resonance of arms, coils and yokes) in the vicinity of the first cover resonance. More importantly, if actuator resonant frequencies coincide with the cover resonant frequencies, the additive effect will increase cover vibration and the noise radiated from the disc drive.

As a result, acoustic noise emanating from a disc drive is a critical performance factor that is usually tightly specified to be below a maximum level. As part of the quality assurances practices when manufacturing disc drives, the drives are tested in an acoustic chamber to determine the amount of noise emanating from the device. Drives that emit noise above a maximum threshold need to be reworked to be in compliance with the requirements.

Government agencies throughout the world are now requiring that the decibel level of average sound energy emanating from office equipment be substantially reduced. Computer manufacturers are also placing acoustic emission standards on disc drive manufacturers. Manufacturers of disc drives have also long recognized that certain improvements for data storage performance in disc drives, namely, to increase disc rotation velocity, contribute to unwanted acoustic noise. There is a marked decrease in human sensitivity to acoustic noise below about 200 Hz and above about 6000 Hz. Thus, it is clearly advantageous to attenuate acoustic noise radiated from disc drives in the frequency range from about 200 Hz to about 4000 Hz.

Several methods to reduce the intensity of unwanted acoustic noise have been attempted. Among the several methods are the use of external dampening techniques for the entire disc drive. Some designers have made strides in addressing the acoustic frequencies that escape from the top cover. The designers use cover dampeners and adhesives with inherent dampening properties on the cover. Other designers have attempted to completely surround the exterior of the disc drive with sound absorbing material. Still other designers have attempted to completely isolate the spindle from the base in order to reduce the unwanted acoustic emissions at multiple frequencies. Such spindle isolation conventionally includes indirect attachment of the spindle to the base.

Disc drives are now being contemplated for use in home entertainment applications such as video and television. One application of disc drives includes adding disc drives to home set top boxes. Users in the home entertainment area are especially sensitive to acoustic noise, since noises seem more pronounced during quiet scenes of a movie or when background music is softly played.

Therefore, it is desirable to reduce such acoustic noise. What is also needed is a simple solution that is not prohibitively costly and which introduces few, if any, new parts to the disc drive. Also needed is an inexpensive method and apparatus which only slightly increases the complexity of the manufacturing processes needed to manufacture the drive. The solution also must not increase the size of the disc drive system. What is also needed is a disc drive with fine tuned cover has a first resonance frequency which is separated from the resonant frequency of the actuator. resonances to provide better acoustical performance.

SUMMARY OF THE INVENTION

A disc drive system includes a cover that is the prime source of acoustical radiation from the disc drive. The cover includes at least one dampening member provided with a cut or slit therein to shift the resonant frequency of the cover away from other resonant frequencies associated with the disc drive. The cut or slit in the dampening member increases the area with a high value of shear deformation in the adhesive and increases the loss factor to shift the resonant frequency when compared to a cover not having a slit dampening member.

A disc drive includes a base plate and a spindle attached to the base plate. In addition, at least one disc is attached to the spindle and the spindle is adapted to rotate with respect to the base plate. The disc drive also includes a cover for attaching to the base plate. The cover and the base plate form a disc enclosure which encloses the at least one disc and a portion of the spindle. An apparatus for reducing noise produced by the disc-drive system includes a cover having a reduced cover stiffness.

In one embodiment, the cover of the disc drive includes at lease one dampening ring. The dampening ring is cut into at least two portions to reduce the cover stiffness while maintaining approximately the same mass. By cutting the dampening ring, the first resonance frequency of the cover is lowered. As a result of cutting the dampening ring, the first resonance of the cover does not coincide with a resonant frequency of the actuator. As a result, excitation of the cover by the actuator will be less. Cutting the dampening ring will not affect the transmission losses of the cover because the cover mass is the same. It will also affect the damping properties of the cover. It increases the loss factor because of increased area with high value of shear deformation in the adhesive that takes place near the edges (because of the additional inner boundaries as a result of splitting).

In some embodiments the dampening ring is cut more than once. The number of cuts is balanced with the number of pieces produced and adding to the complexity of assembling the disc drive. In other embodiments, other portions of the cover may be cut to reduce the cover stiffness and maintain approximately the same mass.

These and various other features, as well as advantages which characterize the present invention, will be apparent upon reading of the following detailed description and review of the associated drawings.

DESCRIPTION OF THE PREFERRED EMBODIMENT

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

Figure 1:
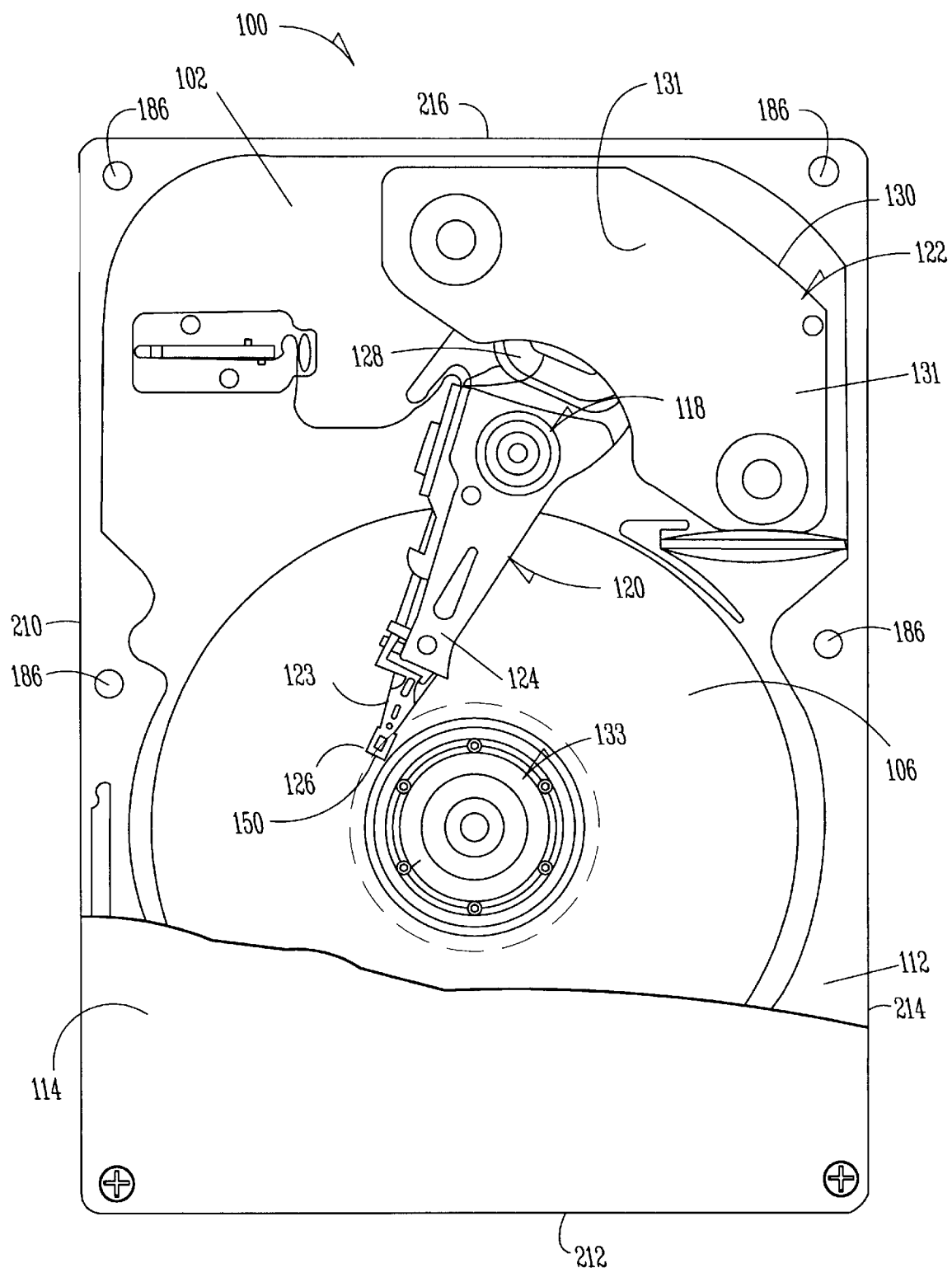
FIG. 1 is an exploded view of a disc drive with a multiple disc stack and a ramp assembly for loading and unloading transducers to and from the surfaces of the discs.

The invention described in this application is useful with many electrical and mechanical configurations of disc drives having either rotary or linear actuation. In addition, the invention is also useful in all types of disc drives including hard disc drives, zip drives, floppy disc drives and any other type of drives where providing a low-noise current source for the transducer may be desirable. FIG. 1 is an exploded view of one embodiment of the present invention in a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123 and suspensions. Attached to the separate or suspension arms 123 on the comb 122, are load beams or load springs 124. Load beams or load springs are also referred to as suspensions. Attached at the end of each load spring 124 is a slider 126 which carries a magnetic transducer 150. In some embodiments, transducer 150 includes a electromagnetic coil write head and a magneto-resistive read head. The slider 126 with the transducer 150 form what is many times called the head. As shown in the figures, it should be noted that many sliders have one transducer 150. This invention is equally applicable to sliders having more than one transducer, such as an MR or magneto resistive head in which one element is generally used for reading and another element is generally used for writing. On the end of the actuator assembly 120 opposite the load springs 124 and the sliders 126 is a voice coil 128.

Figure 2:
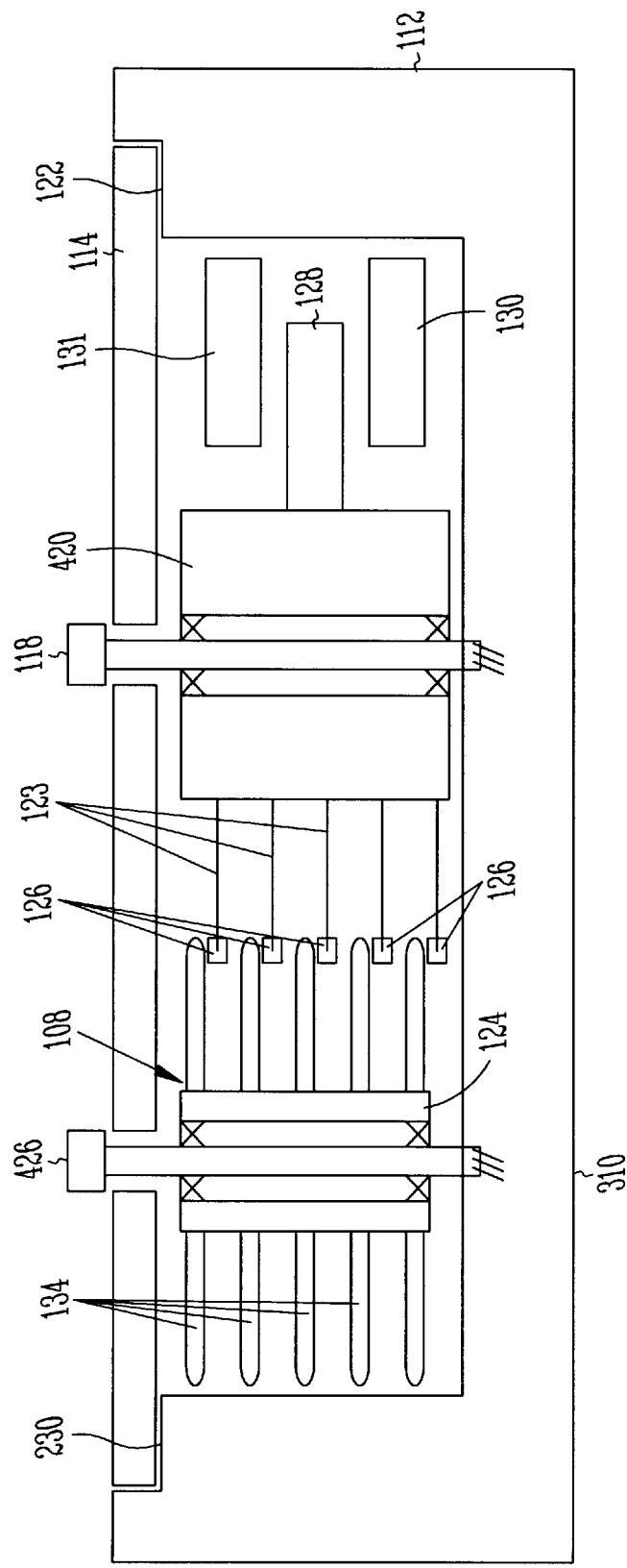
FIG. 2 is a schematic cut away view of an assembled disc drive incorporating the undersized DML cover of the present invention.

Attached within the base 112 is a first magnet 130 and a second magnet 131 (shown schematically in FIG. 2). As shown in FIG. 1, the second magnet 131 is more closely positioned near the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called spindle hub 133. In this particular disc drive, the spindle motor is within hub 133. In FIG. 1, a number of discs 134 (one or more; four are shown) are attached to the spindle hub 133 to form disc stack assembly 132. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

The base 112 includes sidewalls 210, 212, 214 and 216. The sidewalls 210, 212, 214 and 216 include connection points or openings 186. The openings are fairly closely spaced. In some embodiments, the openings are threaded for receiving threaded fasteners. The cover 114 fits over the sidewalls 214, 212, 210 and 216. A recess 230 may be provided in the deck, and specifically in the sidewalls 210, 212, 214 and 216, is sized to accommodate the cover 114.

As shown in FIG. 2, a spindle assembly 108 includes a rotating hub portion 133 and a spindle shaft 142 fixedly coupled to the base chassis 112 and cover 114. Hub portion 133 rotates about spindle shaft 142 via operation of a spindle motor (not shown). Discs 134 are supported on the spindle hub 133 for rotation for operation of the disc drive assembly. The actuator assembly 120 includes a plurality of actuator arms 123 supporting the sliders 126 and transducers 150. The actuator assembly 120 rotates about an actuator shaft 118 similarly fixedly secured relative to the base 112 and cover 114 as illustrated schematically. Rotation of the spindle hub 133 and actuator assembly 120 imparts vibration to the cover 114 via the fixed connection between the shafts 118, 132 of the spindle assembly 108 and actuator assembly 120, respectively and the cover 114. Vibration of the cover 114 at different frequencies can create undesirable acoustic noise. The present invention relates to a cover designed to dampen vibration to reduce acoustic noise.

Figure 3:
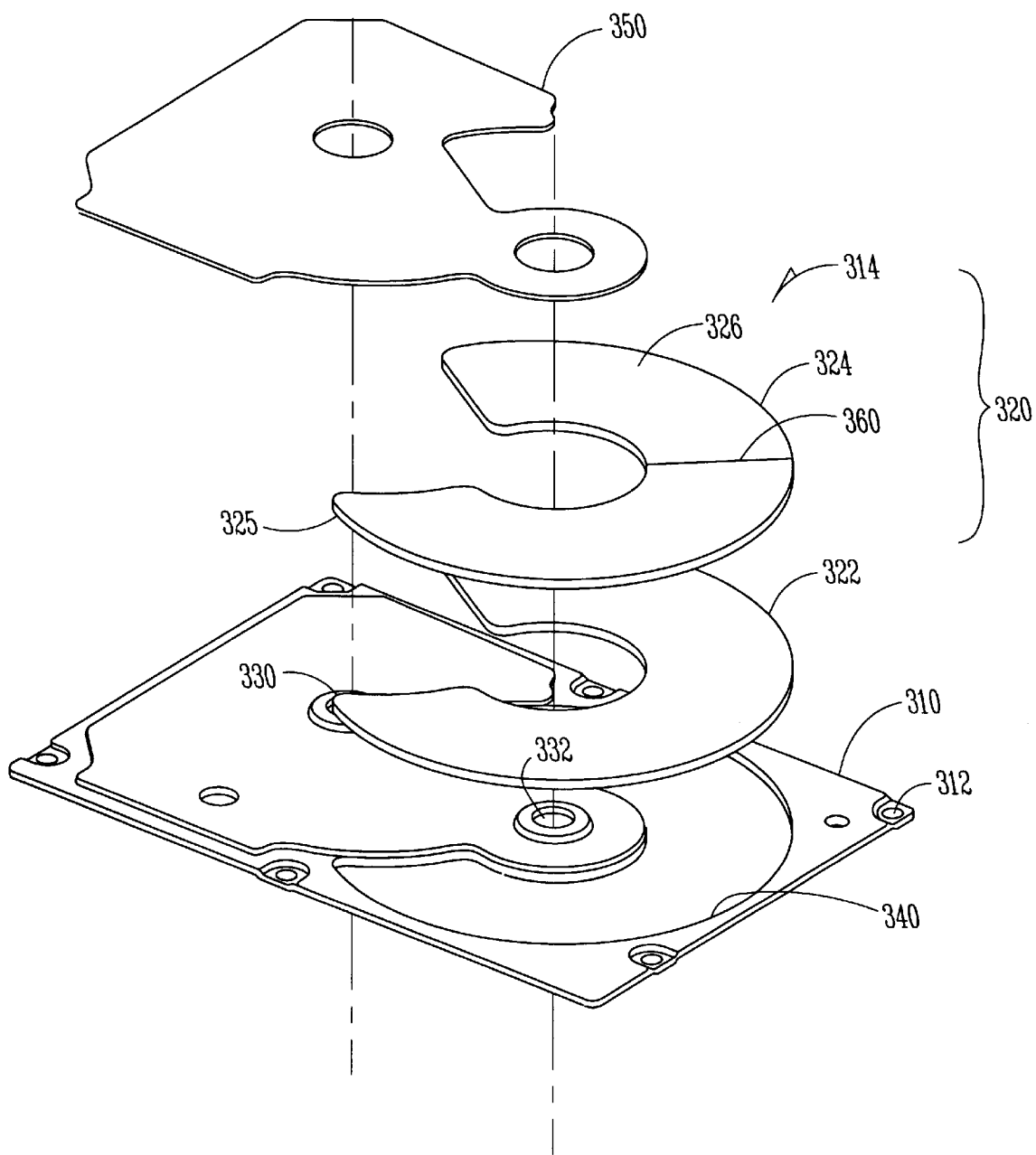
FIG. 3 is an exploded isometric view of a cover including one embodiment of the invention.

FIG. 3 is an exploded isometric view of the cover 314 associated with one embodiment of this invention. The cover 314 includes a main cover portion 310 and a dampening portion 320. The dampening portion 320 includes a first C-shaped or ring dampening portion 322 and a second C-shaped or ring dampening member 324. The main cover portion is rectangular in shape and dimension to fit the form factor of the particular disc drive 100 on which the cover attaches. The cover includes openings 312 about the periphery of the cover for receiving fasteners to attach the main cover portion 310 to the base 112 of the disc drive. The main cover portion 310 includes an opening 330 for receiving a fastener to attach to the access associated with the actuator and an opening 332 for receiving a fastener to attach to the spindle of the disc stack. The main cover portion also includes a recess 340 which is shaped to receive the C-shaped dampening members 322, 324. Each of the C-shaped or ring dampening members 322, 324 is made of stainless steel. Of course, various ring dampeners can have various thicknesses of stainless steel or other material. The ring dampening members 322, 324 are attached to one another by an adhesive. The adhesive has dampening characteristics and is a very thin layer. The C-shaped or ring dampening element 322 is also attached to the recess 340 using an adhesive layer. The cover 314 also includes major surface dampening member 350 which is also adhesively attached to the major surface of the main cover portion of cover 314. The major surface dampening member 350 substantially covers the remaining portion of the main cover portion 310 which is not covered by the C-shaped or ring dampening members 322, 324. The ring dampening member 324 includes a cut or slit 360. The cut or slit 360 divides the C-shaped or ring dampening member 324 into a first portion 325 and a second portion 326. The slit or cut 360 allows the first resonance frequency of the cover to be shifted to a lower frequency band. In practice, the first cover resonance takes place in the frequency range of 1,000 to 1,500 Hz and its width is approximately 50 to 100 Hz depending upon the specific design of the cover. Voice coil motor actuators also have a first acoustically significant resonance in the vicinity of the first cover resonance. The resonance of the arms, coils and yokes of the voice coil motor actuator assembly 120 is in the vicinity of the first cover resonance. If the actuator resonant frequencies happens to coincide with the cover resonant frequencies, an additive effect takes place which increases the overall cover vibration. In the event of an additive effect, the disc drive 100 and specifically the cover 114 will radiate higher levels of noise. The slit 360 causes the first resonance of the cover 314 to be shifted to a lower frequency band. The slit 360 provides separation in terms of frequency between the first resonant frequency of the cover and the first acoustically significant resonance of the voice coil motor actuator assembly so that excitation of the cover 314 by the actuator will not produce excessive noise being radiated from the disc drive 100. The drop in the first resonance of the cover is provided by reducing the cover stiffness while keeping the cover mass the same. The cut or slit 360 does not affect the transmission losses of the cover because the cover mass is the same. Furthermore, the cut or slit 360 does not affect the damping properties of the cover, and the slit or cut 360 increases the loss factor because of the increased area with a high value of shear deformation in the adhesive that takes place near the edges of the two portions 325, 326 of the C-shaped or ring dampening member 324. By splitting the C-shaped or ring dampening member 324 in two, additional inner boundaries result where the adhesive must undergo shear deformation. As shown in FIG. 3, the C-shaped member or ring dampening member 324 has a single cut which is placed along the radial line including an access of the C-shaped or ring dampening member.

Figure 4:
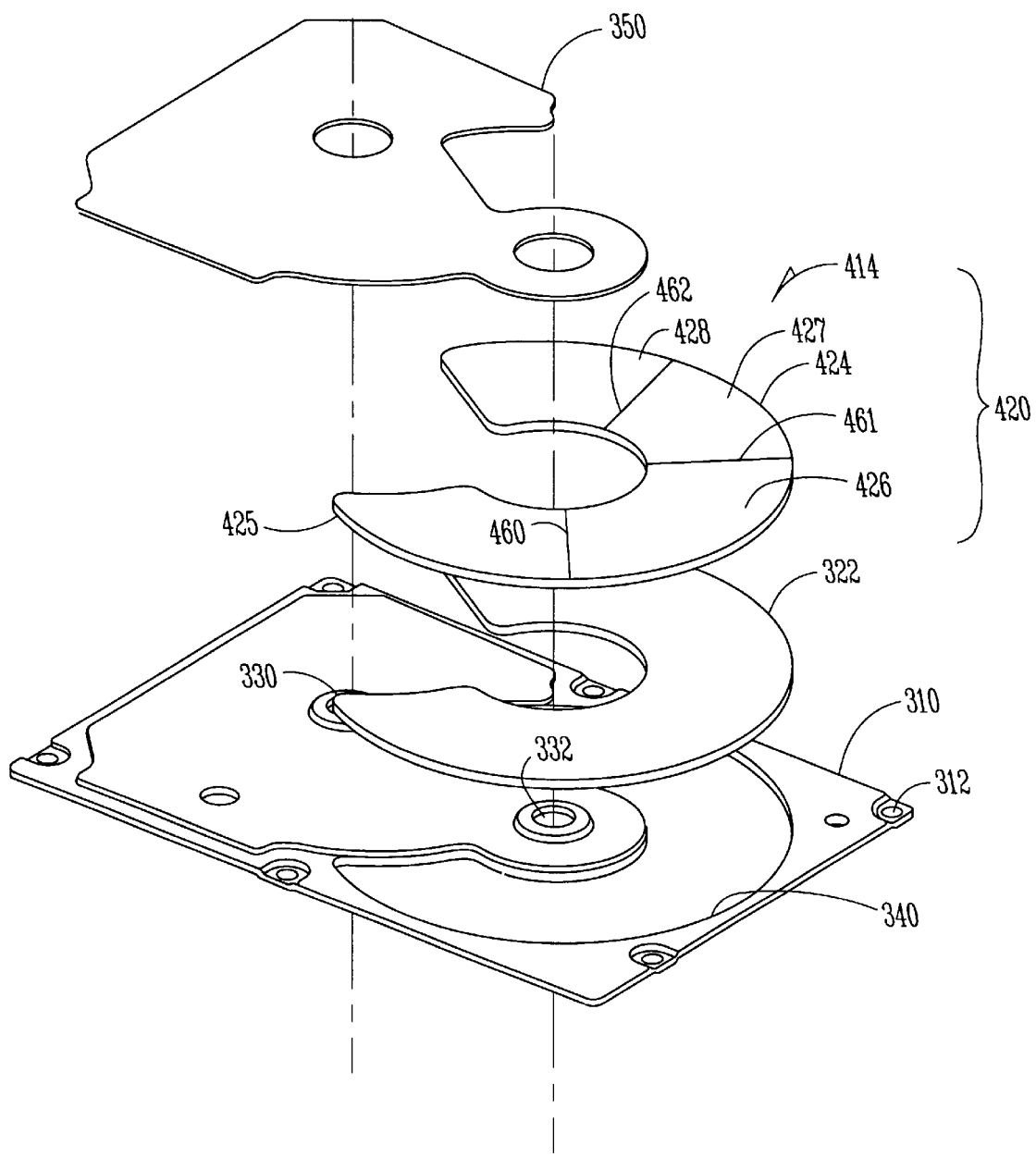
FIG. 4 is an exploded isometric view of a cover including another embodiment of the invention, in which a dampening member includes a plurality of cuts.

FIG. 4 is an exploded isometric view of a cover 414 which includes another embodiment of the invention. The cover 414 includes a main cover portion 310 and a dampening portion 420. The dampening portion 420 includes a first ring dampening member or C-shaped member 322 and a second ring dampening member or C-shaped member 424. The second C-shaped or ring dampening member 424 includes a plurality of cuts, 460, 461 and 462. The plurality of cuts divides the second C-shaped or ring dampening member 424 into four different sections 425, 426, 427 and 428. The remaining portions of the cover 414 are essentially the same as the cover 314. For the sake of brevity, the remaining part of the cover 414 will not be described since the description would be substantially the same as for the cover 314. The cover 414 is significant in that it shows that the ring dampening member or C-shaped member 424 can be cut a number of times rather than a single time. The number of cuts in the ring dampening member is restricted by the wavelength of the cover vibration at the highest frequency of the frequency band. If the frequency band considered is limited to 10,000 Hz, the number of cover resonance in the band is about seven and so the number of cuts should be less than seven. With every subsequent cut, the efficiency of the desirable cover resonance shift is less. A single cut, such as shown and described in FIG. 3, is enough to shift the first cover resonance by 40 to 80 Hz. Adding subsequent cuts is very helpful in shifting second or third order resonances associated with the cover 414. Again, by dividing the C-shaped or ring dampening member 424 into a plurality of pieces 425, 426, 427, 428 the first resonance of the cover is shifted to a lower frequency band so that any excitation by the actuator will be less. The resonance drop is provided by reducing the cover stiffness or making the cover more compliant while keeping the cover 414 mass the same. Again, cutting will not affect the transmission losses of the cover because the cover mass is the same and it will not affect the damping properties of the cover. The loss factor is increased because of the increased area with high value of shear deformation in the adhesive used to attach the ring dampening member 424 to the ring dampening member 322.

Figure 5:
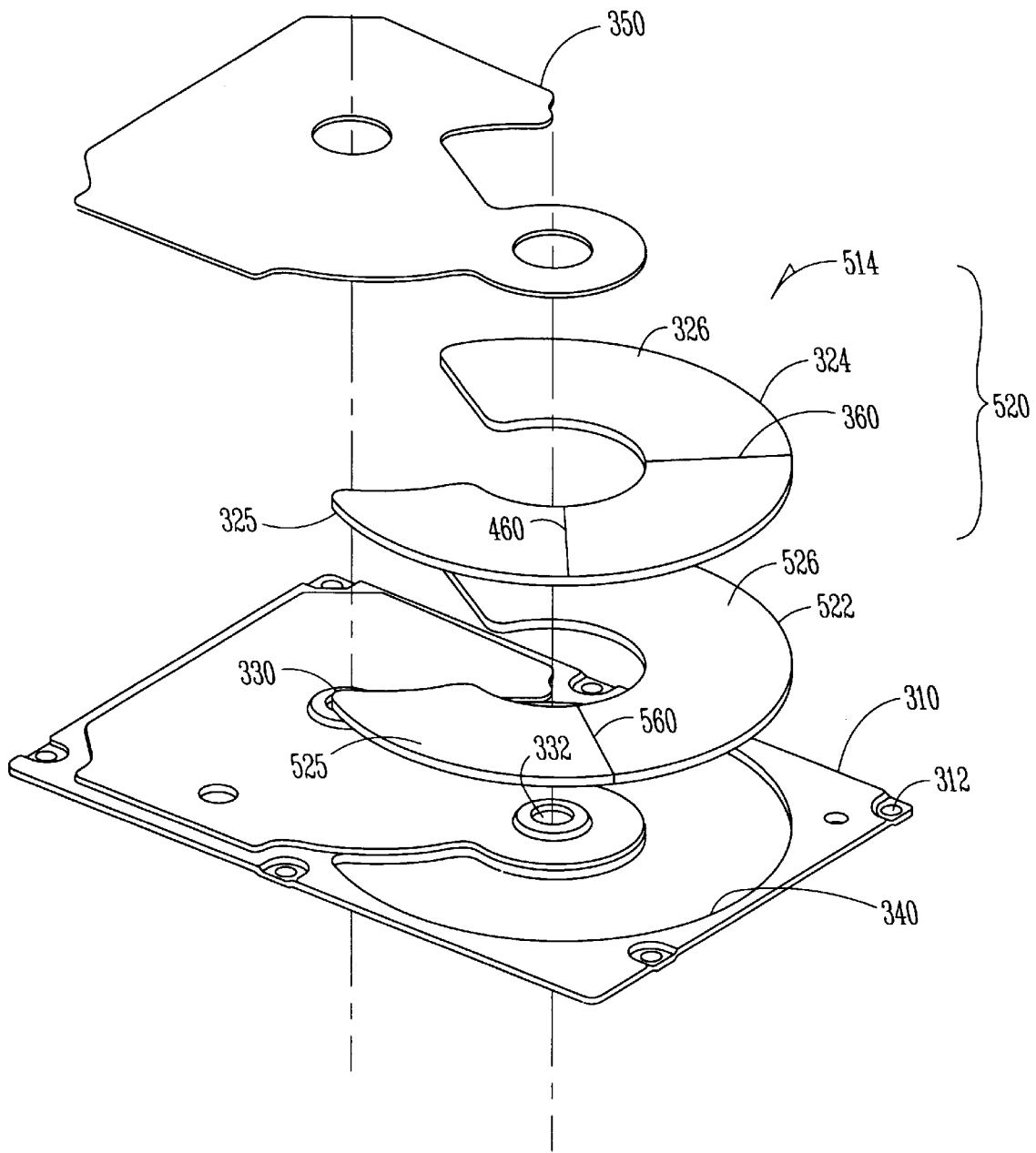
FIG. 5 is an exploded isometric view of a cover including yet another embodiment of the invention, in which a first dampening member includes a cut and a second dampening member includes a cut.

FIG. 5 is an exploded isometric view of a cover 514 including yet another embodiment of the invention. Again, many of the parts or elements of the cover 514 are identical to the cover 314. The identical parts will not be redescribed for the sake of brevity. FIG. 5 does include many of the same reference numbers as FIG. 3 where the common parts are described. The cover 514 includes a main cover portion 310 and a dampening portion 520. The dampening portion includes a first C-shaped or ring dampening member 324 and a second C-shaped or ring dampening member 522. The first C-shaped or ring dampening member 324 includes a cut or slit 360 which divides the first C-shaped or ring dampening member into a first portion 325 and a second portion 326. Similarly, the C-shaped or ring dampening member 522 includes a cut or slit 560 which divides the C-shaped ring dampening member 522 into a first portion 525 and a second portion 526. This increases the compliance or reduces the stiffness of the cover 514 which effectuates a shift in the resonant frequencies associated with the cover 514. The shift is away from the resonant frequency of the actuator assembly 120 so that the cover 514 will not resonate at the same frequency as the actuator assembly 120. This prevents an additive effect on the cover when the resonant frequency of the actuator would be near or equal to the resonant frequency of the cover. Again, cutting will not affect the transmission losses of the cover because the cover mass is the same. Furthermore, the dampening properties of the cover 514 are not affected and the loss factor of the cover is increased due to the increased area with a high value of shear deformation in the adhesive that takes place near the edges of the dampening members 522, 324 as a result of splitting the dampening members 522, 324.

Figure 6:
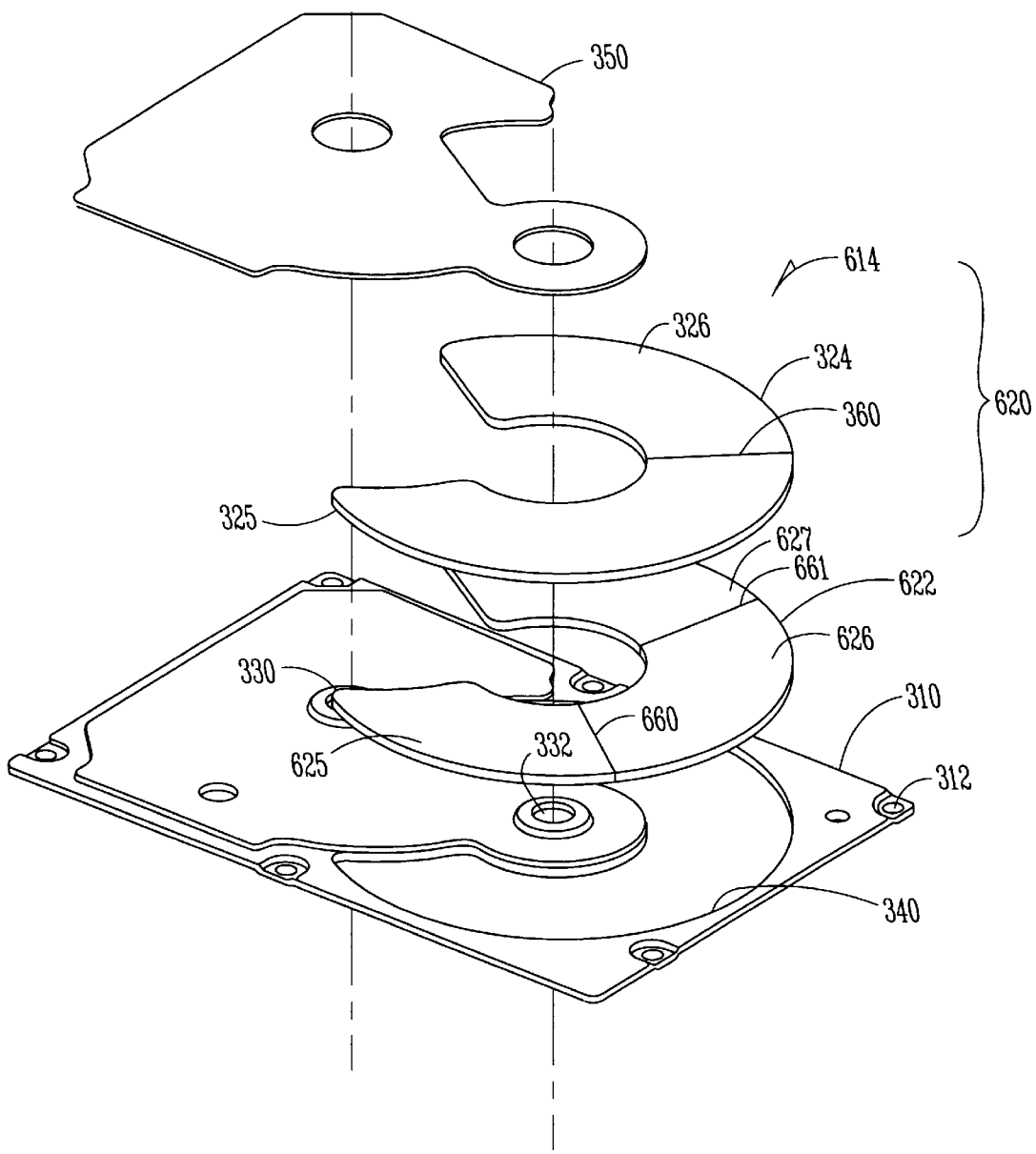
FIG. 6 is an exploded isometric view of a cover including still another embodiment of the invention, in which a first dampening member includes a cut and a second dampening member includes a plurality of cuts.

FIG. 6 is an exploded view of a cover 614 which includes yet another embodiment of the invention. In this particular embodiment, the cover 614 is comprised of a main cover portion 310 and a dampening portion 620. The dampening portion 620 includes a first C-shaped or a ring dampening member 324 which includes a cut 360 dividing the fist C-shaped or ring dampening member into two portions 325 and 326. The dampening portion 620 also includes a second C-shaped or ring dampening member 622 which has multiple cuts 660, 661 which divide the second C-shaped or ring dampening member 622 into three portions 625, 626 and 627. It should be noted that the second ring member portion 622 may have more than two cuts. In other words, this particular embodiment shows that one C-shaped ring dampening member 324 may include a single cut while the other C-shaped or ring dampening member 622 includes multiple cuts or a plurality of cuts. Although two cuts are shown in ring member 622, it should be noted that more cuts can be used and still be within the scope of this embodiment of the invention.

Figure 7:
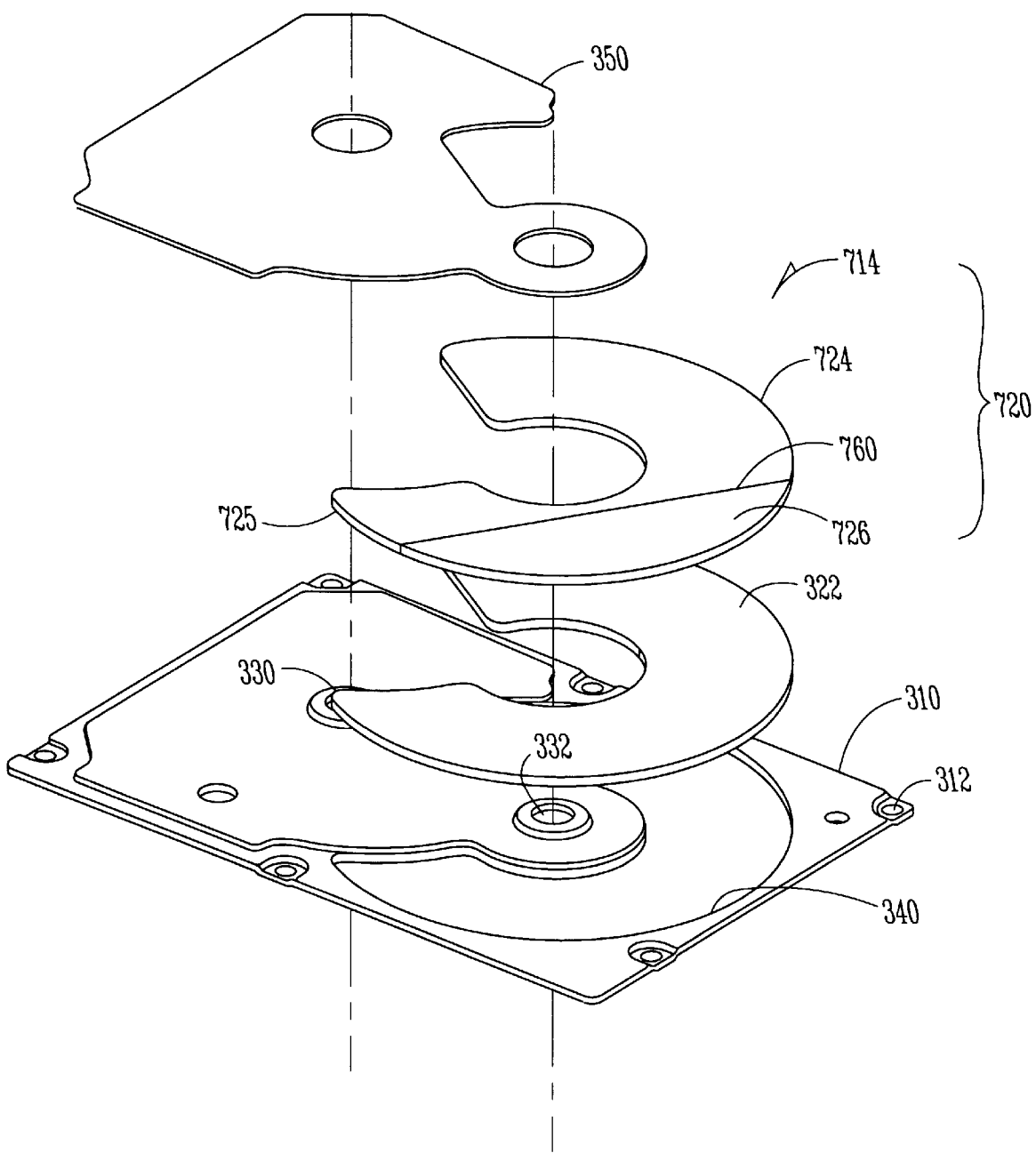
FIG. 7 is an exploded isometric view of a cover including yet another embodiment of the invention, in which a first dampening member includes a cut along a chord of the dampening member.

FIG. 7 shows a cover 714 which includes a main cover portion 310 and a dampening portion 720. The dampening portion includes a first ring member 322 and a second C-shaped or ring dampening member 724. The ring dampening member 724 includes a cut 760 along a cord of the curve formed by the ring dampening member 724. The cut 760 divides the ring dampening member 724 into two pieces 725, 726. The cover 714 is significant in that the cut 760 in one of the C-shaped ring dampening members 724 need not be a radial cut but instead can be along a cord defined by the curve of the ring-shaped or C-shaped dampening member 724.

Figure 8:
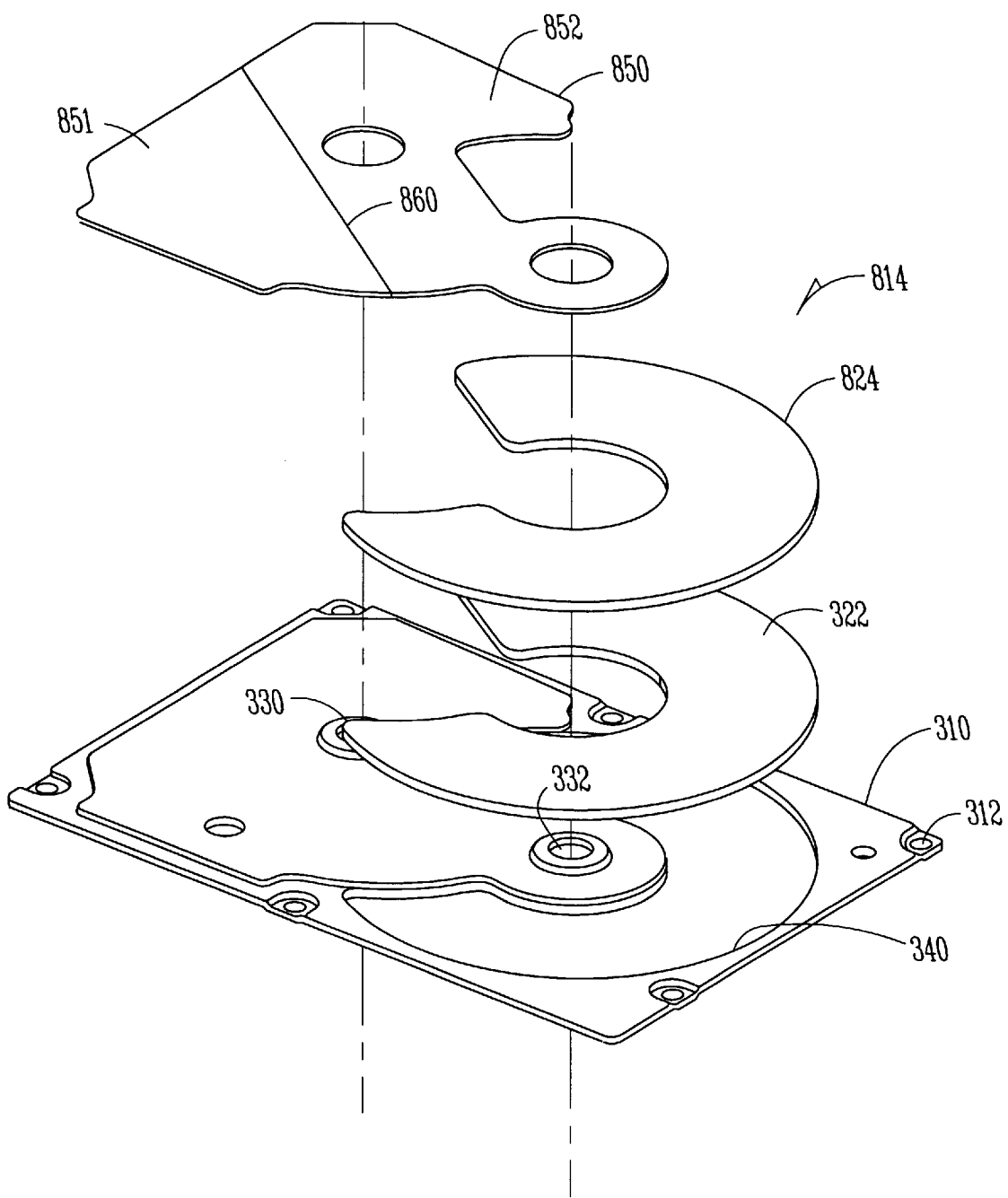
FIG. 8 is an exploded isometric view of a cover including yet another embodiment of the invention.

FIG. 8 is an exploded isometric view of a cover 814 including yet another embodiment of the invention. This particular embodiment includes a main cover portion, a first C-shaped ring 322 and a second C-shaped ring member 824, and a major surface dampening member 850. The major surface dampening member 850 includes a cut 860 which divides the major surface dampening member 850 into a first portion 851 and a second portion 852. The cut 860 again shifts the resonant frequency of the cover 814 away from the resonant frequency of the actuator assembly 120. The drop in the resonant frequency is provided by reducing the stiffness while keeping the cover mass the same. Cutting does not affect the transmission losses of the cover because the cover mass is the same and increases the dampening properties of the cover.

Figure 9:
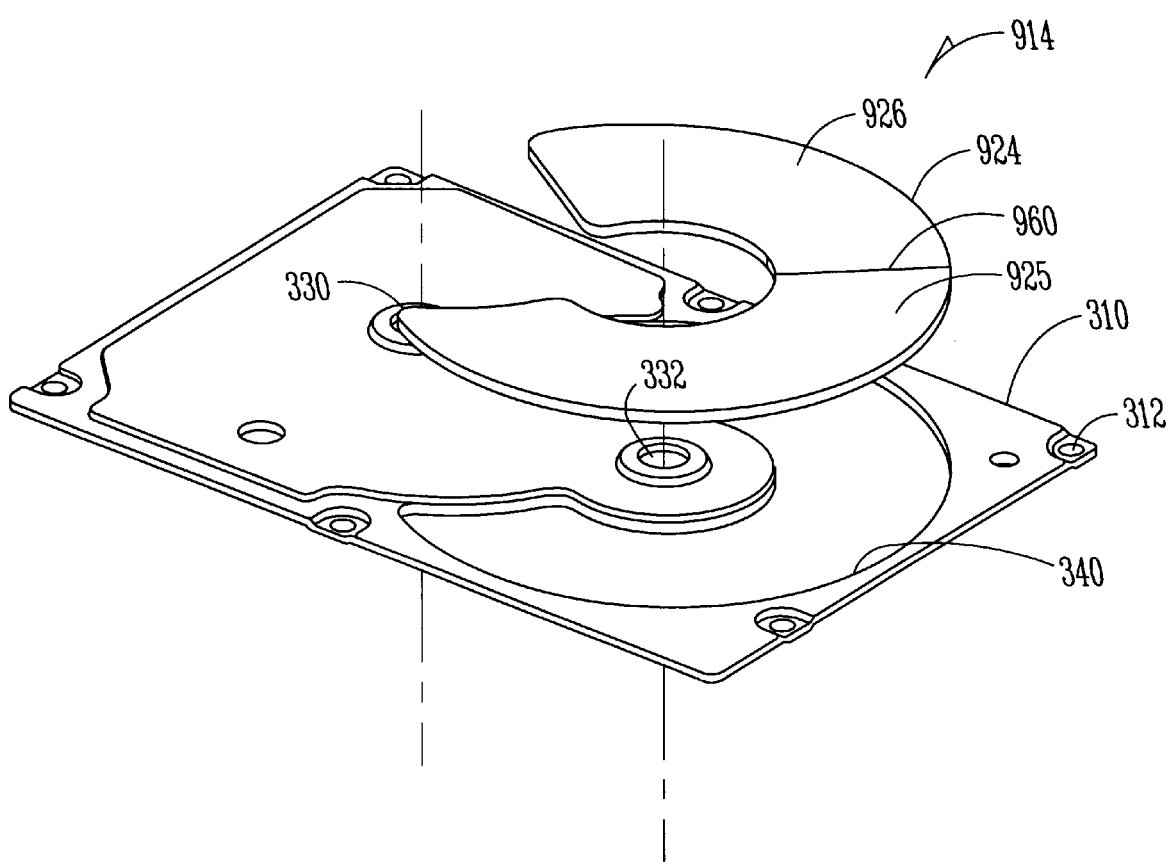
FIG. 9 is an exploded isometric view of a cover including still another embodiment of the invention.

FIG. 9 is an exploded symmetric view of a cover 914 including still another embodiment of the invention. In this particular embodiment of the invention, the cover 914 includes a main cover portion and a single dampening member 924. The dampening member 924 is C-shaped or is a dampening member. The dampening member 924 includes a cut or slit 960 which divides the dampening member 924 into two separate parts 925, 926. The cut 960 results in a drop in the resonant frequency of the cover 914. The frequency tunes the cover so that it does not resonate at or near the same frequency as the voice coil motor actuator and actuator assembly 120 of the disc drive.

Figure 10:
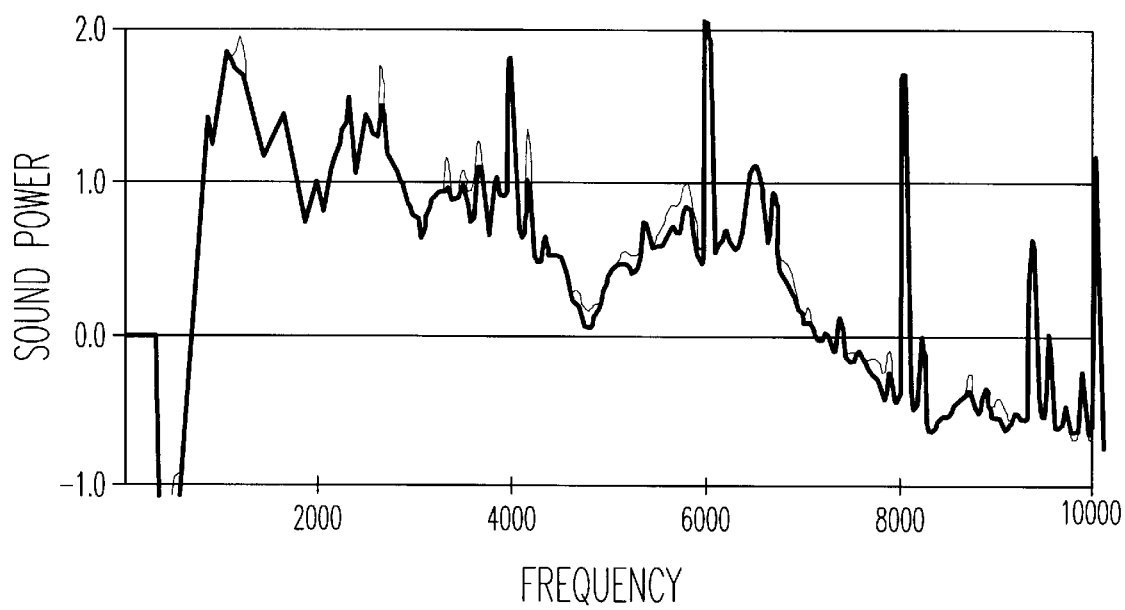
FIG. 10 shows a first chart of the sound power versus frequency.
Figure 11:
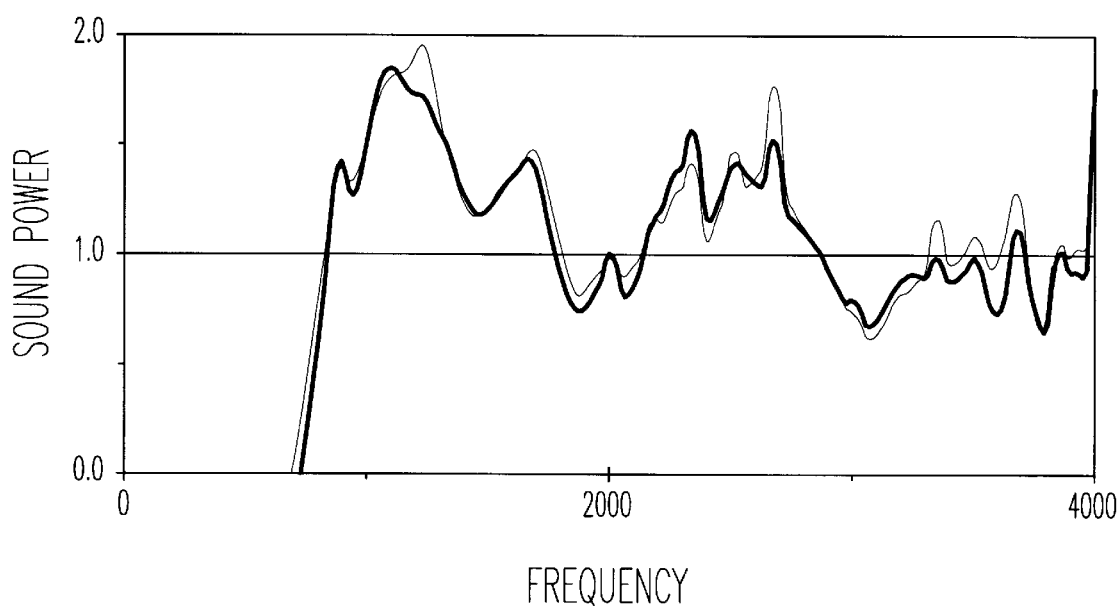
FIG. 11 shows a second chart of the sound power versus frequency.

FIGS. 10 and 11 show a first and second chart respectively of the sound power versus the frequency. In each of the charts, the thin line is a cover in which the dampening members are not split with a cut while the thick line is a cover with a split dampening ring. FIG. 11 shows a frequency range from approximately 800 to 4,000 Hz while FIG. 10 shows the sound power over the range from approximately 800 Hz to about 10,000 Hz. At FIG. 11 shifting of the highest resonance peak at 1240 Hz to 1200 Hz reduces the maximal level by 2 dB. The sound power is the total noise which emanates from the disc drive. As can be seen at FIG. 10, the disc drives tested having a split dampening ring have less sound power at many of the frequencies, that results from increasing in loss factor because of the increased area with high value of shear deformation. Thus, the split ring provides for a reduced emanation or radiation of noise from the disc drive at many frequencies of operation.

Figure 12:
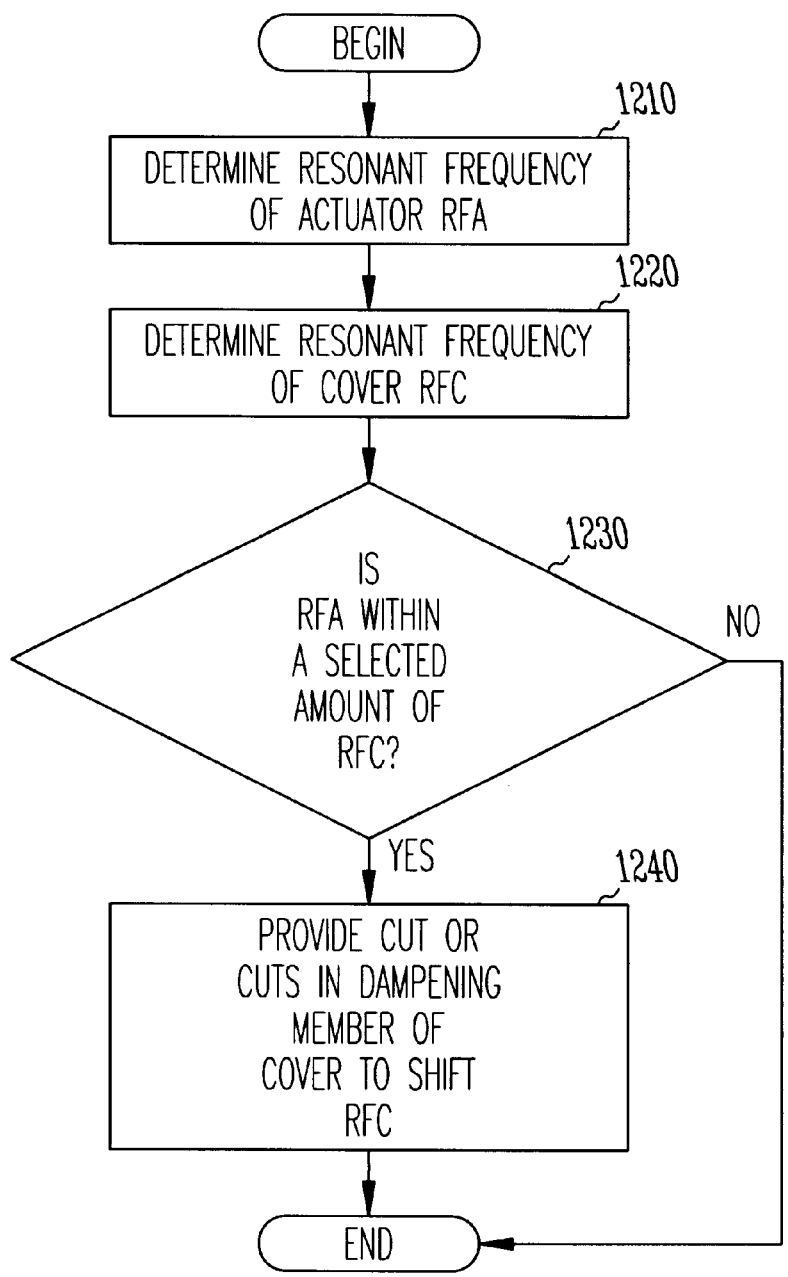
FIG. 12 is a flowchart illustrating a method for shifting the resonant frequency of the cover to reduce emission of acoustic noise from the disc drive.

FIG. 12 is a flowchart illustrating a method for shifting the resonant frequency of the cover to reduce the acoustic noise emission from a disc drive. The initial step is to determine the resonant frequency of the actuator which is designated $RF_a$, as depicted by step 1210. The next step is to determine the resonant frequency of the cover $RF_c$, as designated by step 1220. A decision is then made as depicted by decision box 1230 as to whether $RF_a$ is within a selected amount of $RF_c$. The selected amount is a range of frequencies in which the resonant frequency of the actuator $RF_a$ may produce an additive effect when considering the resonant frequency of the cover $RF_c$. If the resonant frequency of the actuator $RF_a$ is not within a selected amount of $RF_c$, then no action is taken and the process is ended. On the other hand if $RF_a$ is within a selected amount of $RF_c$, a cut is provided in a dampening member of the cover to shift the resonant frequency of the cover away from the resonant frequency of the actuator, as depicted by step 1240. It should be noted that a single cut or multiple cuts may be placed in the dampening member to effectuate the shift in the resonant frequency of the cover $RF_c$. Once the resonant frequency of the cover is a selected distance or a selected frequency range away from the resonant frequency of the actuator, the process ends as depicted by N.1250.

Advantageously, the disc drive having a portion of the cover cut produces less acoustic noise. The solution is simple solution and not prohibitively costly. Although the method arguably introduces new parts for the disc drive, the number of parts are few and the parts are not totally new. In other words, no newly designed parts have to be introduced in the disc drive. The method and apparatus are inexpensive and only slightly increases the complexity of the manufacturing processes needed to manufacture the disc drive. The solution also does not increase the size of the disc drive system. The disc drive still fits within the previous form factor. Furthermore, the disc drive cover is fine tuned cover so that the first resonance frequency of the cover is separated from the resonant frequency of the actuator. The result is a disc drive having better acoustical performance.

Figure 13:
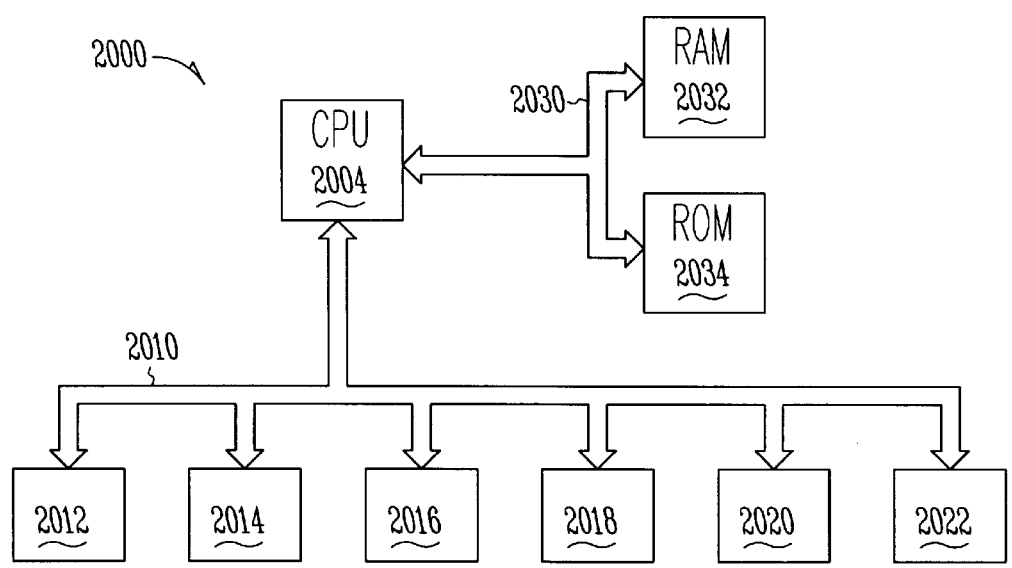
FIG. 13 is a diagram of an information handling system.

FIG. 13 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

Described above is a method and apparatus for reducing radiate noise from a disc-drive system. One embodiment provides a disc drive 100 having a base 112. A spindle 108 is attached to the base 112. At least one disc 134 is attached to the spindle. The spindle 108 rotates with respect to the base 112. A cover such as 114, 314, 414, 514, 614, 714, 814, 914 attaches to the base 112. The cover 114, 314, 414, 514, 614, 714, 814, 914 and the base 112 form a disc enclosure which encloses the disc 134 of the disc drive 100. The cover further includes a main cover portion 310, and a dampening member portion 320, 420, 520, 620, 720, 820 attached to the main cover portion 310. The dampening member portion such as 320, 420, 520, 620, 720, 820, 920 is cut. The cut 360, 460, 560, 660, 760, 860, 960 shifts the resonant frequency of the cover 114, 314, 414, 514, 614, 714, 814. In one embodiment, the dampening member portion is cut into two portions. In other embodiments, the dampening member portion 320, 424, 520, 622 is cut a plurality of times. The dampening member portion 322, 324, 424, 522, 622, 724, 824, 924 is substantially C-shaped and defines an angle through which the C-shaped dampening member extends. The cut 360, 460, 461, 462, 560, 660, 661 is along a radial line and in some embodiments, the cut 360 splits the angle. In other embodiments, the cut 760 is along a chord between two points on the curve defined by the C-shaped dampening member 724. The disc drive 100 which includes the cover 114, 314, 414, 514, 614, 714, 814 and the dampening member 322, 324, 424, 522, 622, 724, 824, 924 fits within a form factor associated with the disc drive 100.

A disc drive 100 includes a base 112, a spindle 108 attached to the base 112, and at least one disc 134 attached to the spindle 108. The spindle 108 is adapted to rotate with respect to the base 112. A cover 114, 314, 414, 514, 614, 714, 814 is attached to the base 112 to form a disc enclosure which encloses the at least one disc 134. The cover 114, 314, 414, 514, 614, 714, 814 further includes a main cover portion 320, 420, 520, 620, 720, 820, a first dampening member portion 322, 522, 622, 722 fitting within a recess in the cover 114, 314, 414, 514, 614, 714, 814, and a second dampening member portion 324, 424, 824 fitting within a recess 340 in the cover 114, 314, 414, 514, 614, 714, 814. One of the first and second dampening member portions 322, 522, 622, 722, 324, 424, 824 is cut to shift the resonant frequency of the cover 114, 314, 414, 514, 614, 714, 814. In one embodiment, one of the first and second dampening member portion 324, 424, 824 is cut into two portions. In other embodiments, one of the first and second dampening member portion 322, 522, 622, 722, 324, 424, 824 is cut a plurality of times. In some embodiments, the first dampening member portion 322, 522, 622, 722 is substantially C-shaped. The first substantially C-shaped dampening member portion 322, 522, 622, 722 defines an angle through which the first C-shaped dampening member extends and the cut 360, 460, 461, 462, 560, 660, 661 being along a radial or along a radial 360 that splits the angle. In other embodiments, the cut 760 is along a chord between two points on the curve defined by the first substantially C-shaped dampening member. The disc drive 100 may further include an adhesive for attaching the first dampening member 322, 522, 622, 722 portion to the second dampening member portion 324, 424, 824. The adhesive may have dampening characteristics. In still other embodiments, the other of the first and second dampening member portion 322, 522, 622, 722, 324, 424, 824 is cut to shift the resonant frequency of the cover. The one of the first dampening member portion and the second dampening member portion 322, 522, 622, 722, 324, 424, 824 may include a plurality of cuts 460, 461, 462, 660, 661 to shift the resonant frequency of the cover 114, 314, 414, 514, 614, 714, 814. In some embodiments, both of the first dampening member portion 322, 522, 622, 722 and the second dampening member portion 324, 424, 824 may include a plurality of cuts to shift the resonant frequency of the cover 114, 314, 414, 514, 614, 714, 814.

Most generally, a disc drive system 100 includes a base 112, a spindle 108 attached to the base 112, and at least one disc 134 attached to the spindle 108. The spindle 108 is adapted to rotate with respect to the base plate 112. The disc drive 100 also includes an actuator assembly 120 attached to the base plate 112, and a cover 114, 314, 414, 514, 614, 714, 814 attached to the base plate 112. The cover 114, 314, 414, 514, 614, 714, 814 includes a device for lessening acoustical emissions produced by the disc drive. In one embodiment, the cover includes a main cover 310, and a dampening member 320, 420, 520, 620, 720, 820. The dampening member 322, 522, 622, 722, 324, 424, 824 is provided with a cut or a plurality of cuts 360, 460, 461, 462, 560, 660, 661, 760 therein. In another embodiment, the cover includes a main cover 310, a first dampening member 322, 522, 622, 722, and a second dampening member 324, 424, 824. One of the first dampening member 322, 522, 622, 722 and second dampening member 324, 424, 824 is provided with a cut or a plurality of cuts 360, 460, 461, 462, 560, 660, 661, 760 therein. In other embodiments, the cover 114, 314, 414, 514, 614, 714 includes a main cover 310, a first dampening member 322, 522, 622, 722, and a second dampening member 324, 424, 824. One of the first dampening member 322, 522, 622, 722 and second dampening member 324, 424, 824 is provided with a single cut therein, and the other of the first dampening member and second dampening member is provided with a plurality of cuts therein.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A disc drive comprising:
    a base;
    a spindle attached to the base;
    at least one disc attached to the spindle, the spindle adapted to rotate with respect to the base plate; and
    a cover attached to the base to form a disc enclosure which encloses the at least one disc, the cover further comprising:
        a main cover portion; and
        a dampening member portion attached to the main cover portion, the dampening member portion being cut into at least two portions to shift the resonant frequency of the cover.

2. The disc drive of claim 1 wherein the dampening member portion is cut a plurality of times.

3. The disc drive of claim 1 wherein the dampening member portion is substantially C-shaped.

4. The disc drive of claim 3 wherein the substantially C-shaped dampening member portion defines an angle through which the C-shaped dampening member extends, the cut being along a radial that splits the angle.

5. The disc drive of claim 3 wherein the substantially C-shaped dampening member portion defines an angle through which the substantially C-shaped dampening member extends, the cut being a radial cut.

6. The disc drive of claim 3 wherein the substantially C-shaped dampening member portion defines an angle through which the C-shaped dampening member extends, the cut being along a chord between two points on the curve defined by the C-shaped dampening member.

7. The disc drive of claim 1 wherein the disc drive fits within a form factor associated with the disc drive.

8. A disc drive comprising:
    a base;
    a spindle attached to the base;
    at least one disc attached to the spindle, the spindle adapted to rotate with respect to the base; and
    a cover attached to the base to form a disc enclosure which encloses the at least one disc, the cover further comprising:
        a main cover portion; and
        a first dampening member portion fitting within a recess in the cover;
        a second dampening member portion fitting within a recess in the cover, wherein one of the first and second dampening member portion is cut into at least two portions to shift the resonant frequency of the cover.

9. The disc drive of claim 8 wherein the one of the first and second dampening member portion is cut a plurality of times.

10. The disc drive of claim 8 wherein the first dampening member portion is substantially C-shaped.

11. The disc drive of claim 10 wherein the first substantially C-shaped dampening member portion defines an angle through which the first C-shaped dampening member extends, the cut being along a radial that splits the angle.

12. The disc drive of claim 10 wherein the first substantially C-shaped dampening member portion defines an angle through which the first substantially C-shaped dampening member extends, the cut being a radial cut.

13. The disc drive of claim 10 wherein the first substantially C-shaped dampening member portion defines an angle through which the C-shaped dampening member extends, the cut being along a chord between two points on the curve defined by the first substantially C-shaped dampening member.

14. The disc drive of claim 8 further comprising an adhesive for attaching the first dampening member portion to the second dampening member portion.

15. The disc drive of claim 8 wherein the adhesive has dampening characteristics.

16. The disc drive of claim 8 wherein the other of the first and second dampening member portion is cut to shift the resonant frequency of the cover.

17. The disc drive of claim 16 wherein one of the first dampening member portion and the second dampening member portion includes a plurality of cuts to shift the resonant frequency of the cover.

18. The disc drive of claim 16 wherein both of the first dampening member portion and the second dampening member portion includes a plurality of cuts to shift the resonant frequency of the cover.

19. A disc drive system comprising:
   a base plate;
   a spindle attached to the base plate;
   at least one disc attached to the spindle, the spindle adapted to rotate with respect to the base plate;
   an actuator assembly attached to the base plate; and
   a cover attached to the base plate, the cover further including means for lessening acoustical emissions produced by the disc drive.

20. The disc drive system of claim 19 wherein the cover first comprises:
   a main cover; and
   a dampening member, the dampening member provided with a cut therein.

21. The disc drive system of claim 19 wherein the cover first comprises:
   a main cover; and
   a dampening member, the dampening member provided with a plurality of cuts therein.

22. The disc drive system of claim 19 wherein the cover first comprises:
   a main cover;
   a first dampening member; and
   a second dampening member, one of the first dampening member and second dampening member provided with a cut therein.

23. The disc drive system of claim 19 wherein the cover first comprises:
   a main cover;
   a first dampening member; and
   a second dampening member, one of the first dampening member and second dampening member provided with a plurality of cuts therein.

24. The disc drive system of claim 19 wherein the cover first comprises:
   a main cover;
   a first dampening member; and
   a second dampening member, both of the first dampening member and second dampening member provided with a cut therein.

25. The disc drive system of claim 19 wherein the cover first comprises:
   a main cover;
   a first dampening member; and
   a second dampening member, one of the first dampening member and second dampening member provided with a single cut therein, and the other of the first dampening member and second dampening member provided with a plurality of cuts therein.

* * * * *